(12) United States Patent
Raman et al.

(10) Patent No.: US 8,705,605 B1
(45) Date of Patent: Apr. 22, 2014

(54) TECHNIQUE FOR PROVIDING LOOPBACK TESTING WITH SINGLE STAGE EQUALIZER

(75) Inventors: Sangeeta Raman, San Jose, CA (US); Tim Tri Hoang, San Jose, CA (US)

(73) Assignee: Altera Corporation, San Jose, CA (US)

( * ) Notice: Subject to any disclaimer, the term of this patent is extended or adjusted under 35 U.S.C. 154(b) by 336 days.

(21) Appl. No.: 13/288,701

(22) Filed: Nov. 3, 2011

(51) Int. Cl.
*H03K 5/159* (2006.01)
*H03H 7/30* (2006.01)
*H03H 7/40* (2006.01)

(52) U.S. Cl.
USPC .......... 375/232; 375/219; 375/220; 375/221; 375/224

(58) Field of Classification Search
USPC .......... 375/219, 220, 221, 224, 232, 295, 316
See application file for complete search history.

(56) References Cited

U.S. PATENT DOCUMENTS

| | | | |
|---|---|---|---|
| 6,215,816 B1 * | 4/2001 | Gillespie et al. | 375/219 |
| 7,276,936 B1 | 10/2007 | Hoang et al. | |
| 7,276,937 B2 | 10/2007 | Hoang et al. | |
| 7,292,065 B2 | 11/2007 | Lui et al. | |
| 7,304,494 B2 | 12/2007 | Wong et al. | |
| 7,304,507 B1 | 12/2007 | Tran et al. | |
| 7,403,035 B1 | 7/2008 | Shumarayev et al. | |
| 7,414,429 B1 | 8/2008 | Kim et al. | |
| 7,417,462 B1 | 8/2008 | Wong et al. | |
| 7,429,897 B1 | 9/2008 | Hoang et al. | |
| 7,436,228 B1 | 10/2008 | Hoang et al. | |
| 7,454,645 B2 | 11/2008 | Li et al. | |
| 7,495,517 B1 | 2/2009 | Hoang et al. | |
| 7,514,968 B1 | 4/2009 | Lai et al. | |
| 7,532,029 B1 | 5/2009 | Asaduzzaman et al. | |
| 7,576,570 B1 | 8/2009 | Wong et al. | |
| 7,586,983 B1 * | 9/2009 | Shumarayev et al. | 375/233 |
| 7,590,207 B1 | 9/2009 | Shumarayev et al. | |
| 7,602,255 B1 | 10/2009 | Lai et al. | |
| 7,619,451 B1 | 11/2009 | Hoang et al. | |
| 7,633,349 B2 | 12/2009 | Hoang et al. | |
| 7,639,993 B1 | 12/2009 | Shumarayev et al. | |
| 7,656,187 B2 | 2/2010 | Tran et al. | |
| 7,659,745 B1 | 2/2010 | Wong et al. | |
| 7,659,838 B2 | 2/2010 | Nguyen et al. | |
| 7,728,674 B1 | 6/2010 | Hoang et al. | |
| 7,750,674 B2 | 7/2010 | Shumarayev et al. | |
| 7,759,972 B1 | 7/2010 | Shumarayev et al. | |
| 7,782,935 B1 | 8/2010 | Wong et al. | |
| 7,791,370 B1 | 9/2010 | Hoang et al. | |
| 7,812,634 B1 | 10/2010 | Shumarayev et al. | |
| 7,812,659 B1 | 10/2010 | Shumarayev et al. | |
| 7,860,203 B1 | 12/2010 | Shumarayev et al. | |
| 7,893,726 B1 | 2/2011 | Ho et al. | |
| 7,899,649 B1 | 3/2011 | Wong et al. | |
| 7,903,679 B1 | 3/2011 | Shumarayev et al. | |
| 7,920,621 B2 | 4/2011 | Wong et al. | |
| 7,956,696 B2 | 6/2011 | Hoang et al. | |
| 7,986,160 B2 | 7/2011 | Hoang et al. | |

(Continued)

*Primary Examiner* — Ted Wang
(74) *Attorney, Agent, or Firm* — Fletcher Yoder, P.C.

(57) ABSTRACT

Devices and methods for serial loopback testing in an integrated circuit (IC) are provided. To implement loopback testing, an equalizer stage of a receiver of the IC is powered down. In addition, the common-mode voltage of the equalizer stage is reduced and/or a bulk node of the equalizer stage is connected to ground. Doing so may reduce the impact of capacitive coupling from the input pins of buffer, thereby improving the quality of the loopback output signal.

21 Claims, 13 Drawing Sheets

(56) References Cited

U.S. PATENT DOCUMENTS

| | | |
|---|---|---|
| 7,994,837 B1 | 8/2011 | Ho et al. |
| 7,996,749 B2 | 8/2011 | Ding et al. |
| 8,049,532 B1 | 11/2011 | Maangat et al. |
| 8,063,807 B1 | 11/2011 | Lai et al. |
| 8,120,429 B1 | 2/2012 | Hoang et al. |
| 8,126,079 B1 | 2/2012 | Tran et al. |
| 8,127,215 B2 | 2/2012 | Ding et al. |
| 8,175,143 B1 | 5/2012 | Wong et al. |
| 8,188,774 B1 | 5/2012 | Krishnamurthy et al. |
| 8,189,729 B2 | 5/2012 | Hoang et al. |
| 8,208,528 B1 | 6/2012 | Lai et al. |
| 2009/0154595 A1* | 6/2009 | Choksi et al. ................. 375/295 |
| 2009/0161738 A1 | 6/2009 | Carvalho et al. |
| 2011/0188621 A1 | 8/2011 | Asaduzzaman et al. |
| 2011/0296215 A1* | 12/2011 | Mobin et al. .................. 713/323 |
| 2012/0063556 A1 | 3/2012 | Hoang |

\* cited by examiner

TECHNIQUE FOR PROVIDING LOOPBACK TESTING WITH SINGLE STAGE EQUALIZER

BACKGROUND

Embodiments of the present invention relate generally to integrated circuits (ICs). More particularly, embodiments of the present invention relate to loopback testing techniques that may be implemented in an IC (e.g., a programmable logic device) having a transceiver with a single stage equalizer in the receiver channel.

This section is intended to introduce the reader to various aspects of art that may be related to various aspects of the present invention, which are described and/or claimed below. This discussion is believed to be helpful in providing the reader with background information to facilitate a better understanding of the various aspects of the present invention. Accordingly, it should be understood that these statements are to be read in this light, and not as admissions of prior art.

Integrated circuits (ICs) take a variety of forms. For instance, a programmable logic device (PLD) may be an integrated circuit that may be programmed (e.g., configured) to provide a desired functionality that the PLD is designed to support. Generally, PLDs may include programmable blocks of logic, input/output (I/O) logic, as well as high-speed communication circuitry. For instance, the high-speed communication circuitry may include high-speed transceiver channels through which the PLD may transmit serial data to and/or receive serial data from circuitry that is external to the PLD. Accordingly, the high-speed communication circuitry may support any of various desired communication protocols.

For testing purposes, transceiver channels may incorporate several internal loopback testing schemes in which different signal paths may be tested in order to identify weak spots in a particular design and to narrow down or pin-point on-die and/or chip-to-chip issues. One such loopback mode is a serial loopback mode, wherein full-swing serialized data from the transmitter (TX) side of the transceiver channel is brought to the receiver (TX) channel and outputted via the output pins of the receiver (RX) side. In RX designs having multiple equalizer stages, the final equalizer stage may remain powered on during loopback testing while all preceding equalizer stages are powered off. Thus, the loopback signal may pass through the final equalizer stage and onto the RX output pins, where it may be passed to logic further downstream. In this case, inputs to the RX input pins could continue to toggle without impacting the loopback path performance, since all intermediate equalizer stages upstream from the final equalizer stage are powered off, thus insulating the RX input pins from the loopback path.

Unfortunately, in certain IC designs, such as those where the equalizer logic of the receiver side of a transceiver channel may be reduced or simplified to a single stage, serial loopback testing may be more challenging. For instance, since there are no additional equalizer stages that may be used to isolate the loopback path from the RX input pins in a single stage design, toggling of the RX input pins may generate capacitive coupling at the RX output pins, which may negatively impact the loopback signal.

SUMMARY

Certain aspects of embodiments disclosed herein by way of example are summarized below. It should be understood that these aspects are presented merely to provide the reader with a brief summary of certain forms an invention disclosed and/or claimed herein might take and that these aspects are not intended to limit the scope of any invention disclosed and/or claimed herein. Indeed, any invention disclosed and/or claimed herein may encompass a variety of aspects that may not be set forth below.

The present disclosure generally relates to techniques for implementing serial loopback testing in a transceiver where the receiver (RX) includes a single stage equalizer. In loopback testing mode, in addition to powering off the equalizer, the common-mode voltage of the equalizer is also reduced. This may reduce the impact of capacitive coupling, thereby improving the quality of the loopback signal on the RX output pins.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present invention alone or in any combination. Again, the brief summary presented above is intended only to familiarize the reader with certain aspects and contexts of embodiments of the present disclosure without limitation to the claimed subject matter.

BRIEF DESCRIPTION OF THE DRAWINGS

These and other features, aspects, and advantages of the present disclosure will become better understood when the following detailed description of certain exemplary embodiments is read with reference to the accompanying drawings in which like characters represent like parts throughout the drawings, wherein.

DETAILED DESCRIPTION OF SPECIFIC EMBODIMENTS

One or more specific embodiments of the present invention will be described below. These described embodiments are only exemplary of the present invention. Additionally, in an effort to provide a concise description of these exemplary embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

As discussed below, the present disclosure relates generally to serial loopback testing in a transceiver of an integrated circuit (IC). More particularly, the present disclosure relates to serial loopback testing in a transceiver where the receiver path (RX) includes an RX differential buffer having a single equalizer stage. In loopback testing mode, the equalizer stage may be powered down, and a common mode voltage for the equalizer may be reduced. By reducing the common mode voltage, the effects of capacitive coupling from the input pins of the RX buffer on the loopback path is reduced, thereby improving loopback signal quality. Certain particular examples presented below will relate to programmable logic devices (PLDs). However, it should be understood that the present disclosure relates to any integrated circuits with suitable circuitry.

Figure 1:
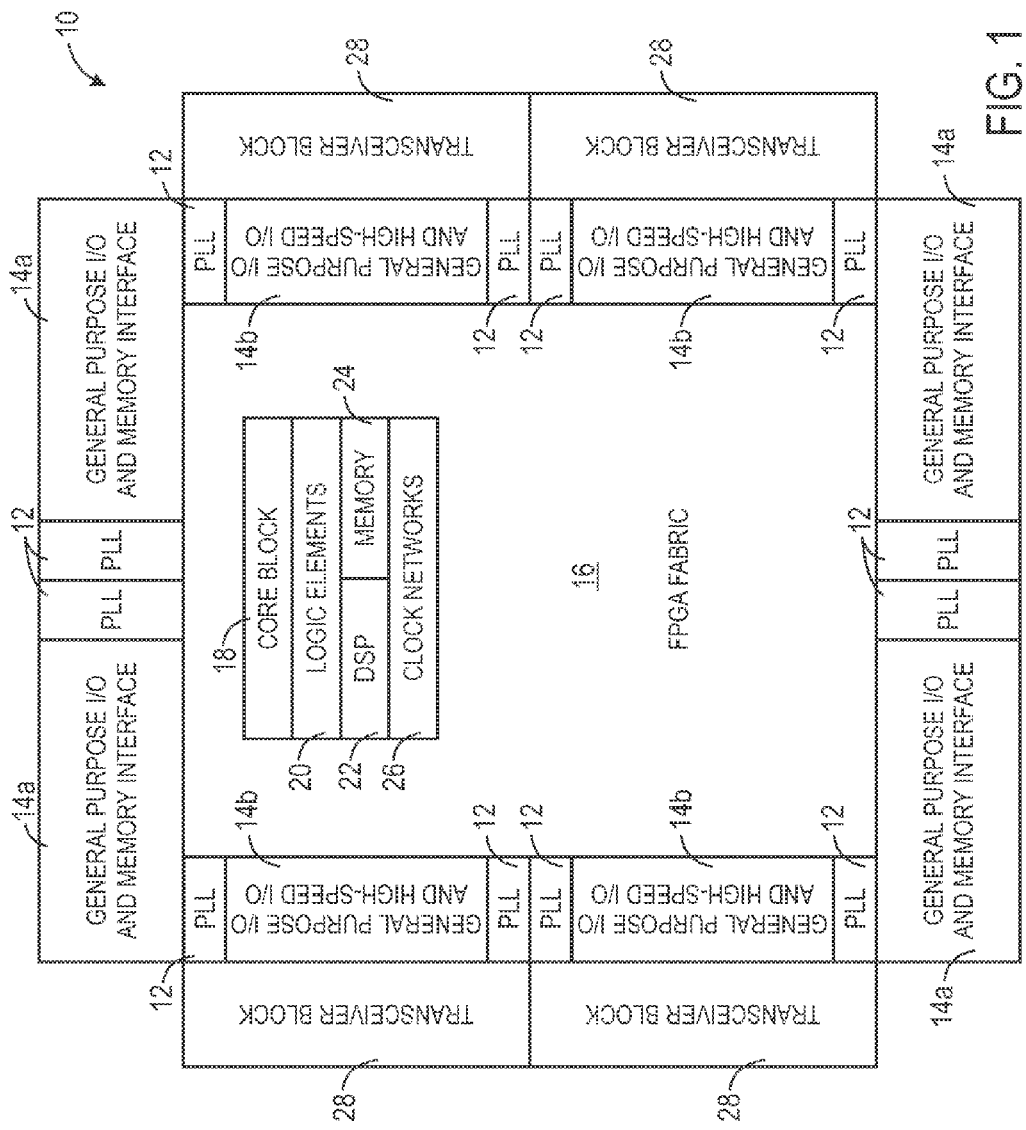
FIG. 1 is a block diagram of an programmable logic device that includes transceivers having a receiver with a single stage equalizer, wherein the transceiver is configured to provide serial loopback testing, in accordance with an embodiment of the present disclosure.

With these points in mind, FIG. 1 is a block diagram showing an example of a programmable logic device (PLD) 10, in accordance with an embodiment of the present disclosure. For example, the PLD 10 may be a field-programmable gate array (FPGA) and may be configurable to provide any desired functionally that the FPGA 10 is designed to support. By way of example, in one embodiment, the FGPA 10 may be a model of an Arria® FPGA, available from Altera Corporation of San Jose, Calif. As can be appreciated, the block diagram shown in FIG. 1 is merely intended to be a simplified block diagram of an FPGA 10, and thus may not necessarily depict all elements that may be present in an actual FPGA implementation. Moreover, although the FPGA 10 is provided in the present example, it should be understood that other embodiments may include application-specific integrated circuits (ASICs) and/or application-specific standard products (ASSPs).

As shown in FIG. 1, the PLD 10 may include phase lock loops (PLLs) 12 and input/output (I/O) blocks 14 that enable the PLD 10 integrate and communicate with other devices and systems. For example, the PLLs 12 may support various clocking techniques (e.g., spread-spectrum input clocking, dynamic reconfiguration, programmable bandwidth, etc.) to help synchronize the PLD 10 with other component parts of the PLD 10, or with devices or systems external to the PLD 10. By way of example, the I/O blocks 14, which may include general purpose I/O and memory interface blocks 14A and general purpose I/O and high speed I/O blocks 14B, may be configured in banks of 24 to 48 I/O blocks and may support various industry I/O standards, such as single-ended and differential I/O standards, such that the PLD 10 may communicate with other devices using industry standard communication protocols. In other embodiments, the PLD 10 may also be configured support one or more proprietary communication protocols. By way of example, in some embodiments, the PLD 10 may be configured with physical layer support for gigabit Ethernet, XAUI, HiGig, and other protocols.

An array of programmable logic is located in the PLD 10 and constitutes an FPGA fabric 16. In the illustrated embodiment, the FPGA fabric 16 includes a core block 18 that may have logic elements 20, digital signal processing (DSP) 22, memory 24, and clock networks 26, among other things. The logic elements 20, DSP 22, memory 24 and clock networks 26 may be user-configurable so that the PLD 10 may perform specific desired functions. In some embodiments, the logic elements 20 may be packaged in adaptive logic modules (ALMs) with a group of ALMs (e.g., 10 ALMs) configured in a logic array block (LAB). Additionally, the PLD 10 may include communication circuitry, such as the transceiver blocks 28.

Figure 2:
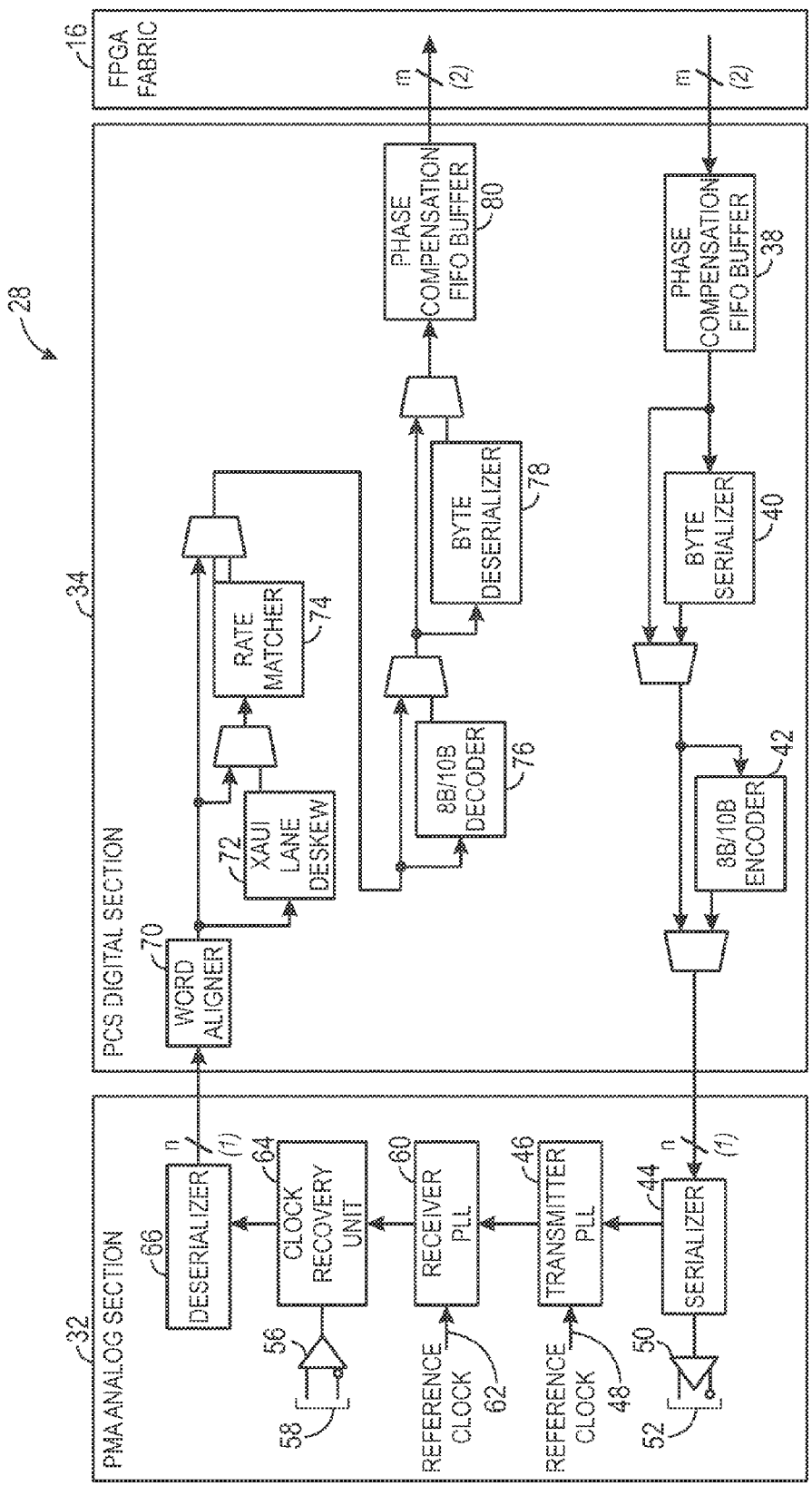
FIG. 2 is a block diagram depicting one of the transceivers of the programmable logic device of FIG. 1 in more detail, in accordance with one embodiment.

A block diagram depicting an embodiment of the transceiver 28 is illustrated in FIG. 2, in accordance with one embodiment. By way of example, the illustrated transceiver 28 may be a transceiver of a model of an Arria® FPGA, available from Altera Corporation. In certain embodiments, the transceiver 28 may be configured to operate at data rates of between 0.6 Gbps to 10.3125 Gbps or greater. Other embodiments may provide for faster or slower data rates, depending on the specific design goals of a particular implementation. The transceiver 28 may implement building blocks for a number of protocols, such as PCI Express, Gigabit Ethernet, SDI, SerialLiteII, XAUI, Serial RapidIO, OIF CEI-6G, and so forth. In one embodiment, the FPGA 10 may include between 4 to 12 transceiver channels. Further, while the present transceiver 28 depicts a single RX and TX channel for simplicity, it should be appreciated that the transceiver 28 may actually include multiple RX and TX channels.

As shown in FIG. 2, the transceiver 28 may include a physical medium attachment (PMA) section 32 (e.g., an analog portion) and a physical coding sub-layer (PCS) section 34 (e.g., a digital portion that may interface with the FPGA fabric 16). In the illustrated embodiment, the transmitter (TX) path of the transceiver 28 may include a phase compensation FIFO (first-in-first-out) buffer 38, byte serializer 40, encoder 42, serializer 44, TX phase lock loop (PLL) 46 (receiving reference clock signal 48), and differential output buffers 50. As will be appreciated, some of the transmitter components may be optional in some embodiments, and may be bypassed or omitted. A brief discussion of the above-mentioned transmitter components is provided below in order from the phase compensation FIFO 38 to the TX buffer 50.

The phase compensation FIFO buffer 38 is located at each TX channel's logic array interface and may be configured to compensate for the phase difference between the transmitter PCS block and the local PLD transmitter clock. The TX phase compensation FIFO buffer 38 may support various functional modes. For example, in one embodiment, the TX phase compensation FIFO buffer 38 may be 8 words deep in PCI Express (PIPE) mode and 4 words deep in other modes. Next, the byte serializer 40 is essentially a parallel-to-serial converter. It may be configured to receive two-byte wide data from the TX phase compensation FIFO buffer 38, and serialize it into one-byte wide data at twice the speed. The transmit data path after the byte serializer 40 may thus be 8 or 10 bits. As can be appreciated, this allows the PLD 10 to clock the PLD-transceiver interface at half the speed as compared to the transmitter PCS logic 34.

The transmitter also includes an 8B/10B encoder block 42. The 8B/10B encoder 42 may be configured to receive 8-bit data from the byte serializer 40 or from the transmitter phase compensation FIFO buffer 38 (e.g., in bypass mode). In the present embodiment, the encoder 42 may generate a 10-bit code group with proper running disparity from the 8-bit character and a 1-bit control identifier. For instance, when the control identifier is low, the 8-bit character is encoded as a data code group. When the control identifier is high, the 8-bit character is encoded as a control code group. The bit serializer block 44 may clock in 8- or 10-bit encoded data from the encoder 42 using a low-speed parallel clock, while clocking out serial data using a high-speed serial clock. In some embodiments, the bit serializer 44 may support a variety of conversion factors to provide flexibility.

The transmitter path also includes the TX PLL 46, which may be configured to generate desired clock frequencies based upon an input reference clock 48. The TX PLL 46 may support multiplication factors to allow the use of various input clock frequencies. In one embodiment, the TX PLL 46 may include one or multiple PLLs (e.g., two or more), and may support data ranges of between 0.6 Gbps to 10.3125 Gbps. The output of the bit serializer 44 is sent to the TX differential output buffer 50, which may output differential signals 52. By way of example, in one embodiment, the TX output buffer 50 may support 1.2 V and 1.5 V PCML I/O standards at rates of up to 3.125 Gbps, with a common-mode voltage of the output driver set to between approximately 0.6 to 0.8 V.

The receiver (RX) path of the transceiver 28 may include differential input buffers 56 (receiving input signals 58), RX PLL 60 (receiving input reference clock 62), clock recovery unit 64, deserializer 66, word aligner block 70, XAUI lane deskew block 72, rate matcher block 74, 8B/10B decoder 76, byte deserializer 78, and RX phase compensation FIFO buffer 80. Again, it should be understood that the illustrated receiver components are only an example of what may be found in a receiver of the transceiver block 28. In some embodiments, certain components may be optional, bypassed, or omitted. A brief discussion of the above-mentioned receiver components is provided below in order from the RX buffer 56 to the RX phase compensation FIFO 80.

The RX buffer 56 may support 1.2-V and 1.5-V PCML I/O standards and may provide features to improve system signal integrity. In accordance with an embodiment of the present disclosure, the RX buffer 56 may include a single stage equalizer, wherein the common mode voltage of the RX buffer 56 may be programmable between approximately 0.8V to 1.2V during normal operation. Further, as discussed in more detail below, during loopback testing, the common mode voltage may be programmable to a lower level (e.g., 0.3-0.5V), which may reduce capacitive coupling and improve signal quality at the RX output pins.

Each RX channel of the transceiver block 28 may include an RX PLL 60 that may provide clocking flexibility and support for a range of data rates. In one embodiment, each transceiver block 28 may include multiple (e.g., 4 to 8 or more) RX PLLs 60 and clock recovery units (CRUs), each of which is dedicated to a respective receiver channel. As shown in FIG. 2, the RX PLL 60 receives an input reference clock 62. The RX PLL 60, in conjunction with the CRU 64, may be configured to generate two clocks: a high-speed serial recovered clock that clocks the deserializer 66, and a low-speed parallel recovered clock that clocks the RX digital logic. By way of example, in certain embodiments, the RX PLL 60 may support data rates from 0.6 Gbps up to 3.125 Gbps, or more in some cases.

The deserializer 66 is essentially a serial-to-parallel converter, and may be configured to clock in serial input data from the RX buffer 56 using the high-speed serial recovered clock signal from the CRU 64. The deserializer 66 may convert the serial input data into 8- or 10-bit parallel data using the low-speed parallel recovered clock signal from the CRU 64. Next, the parallel data from the deserializer 66 is received by the word aligner 70. The word aligner 70 may be configured to align the incoming data based on specific byte word boundaries. For example, the word aligner 70 may include programmable pattern detection logic that may align word boundaries using a single 7- or 10-bit pattern. For instance, the pattern detection logic may be configured to do an exact match, or match of the exact pattern and a complement of the pattern. Once a programmed pattern is found, the data stream may be aligned to have the pattern on the least significant bit (LSB) portion of the data bus.

Lane deskew logic 72 may be a channel aligner that is configured to align byte boundaries across multiple channels and to synchronize the data entering the FPGA fabric 16. In one embodiment the logic 72 may be implemented in accordance with a channel bonding specification, such as set forth in IEEE 802.3ae, clause 48. Next, rate matcher logic 74 may compensate for small clock frequency differences between the upstream transmitter and the local receiver blocks. For instance, in asynchronous systems, the upstream transmitter and local receiver may be clocked with independent reference clock sources. Frequency differences of even a few hundred PPM (parts per million), a common measure of frequency variation, may potentially corrupt data at the receiver. Accordingly, the rate matcher logic 74 may compensate for such differences by inserting or removing skip characters from the inter packet gap (IPG) or idle streams. For instance, a skip characters may be inserted if the local receiver is running under a faster clock than the upstream transmitter, whereas a skip character may be deleted if the local receiver is running under a slower clock than the upstream transmitter. As can be appreciated, the rate matcher logic 70 may operate under various functional modes, such as XAUI, PIPE, GIGE, or basic functional modes, with each mode having a respective PPM tolerance.

Next, the 8B/10B decoder block 76 may receive data from the rate matcher logic 74. For example, if the incoming data is 10-bit data, the decoder 76 may decode the data into 8-bit data with a 1-bit control identifier, thus restoring the original transmitted data at the receiver. Downstream from the decoder block 76 is a byte deserializer 78. The deserializer 78 may be configured to receive one-byte wide data from the decoder 76 and to deserialize it into two-byte wide data at half the speed. This allows for the PLD-receiver interface to be clocked at half the speed compared to the receiver PCS logic. The RX phase compensation FIFO buffer 80, which is located at the receiver channel's logic array interface, may be configured to compensate for phase differences between the receiver PCS clock and the local PLD receiver clock.

Figure 3:
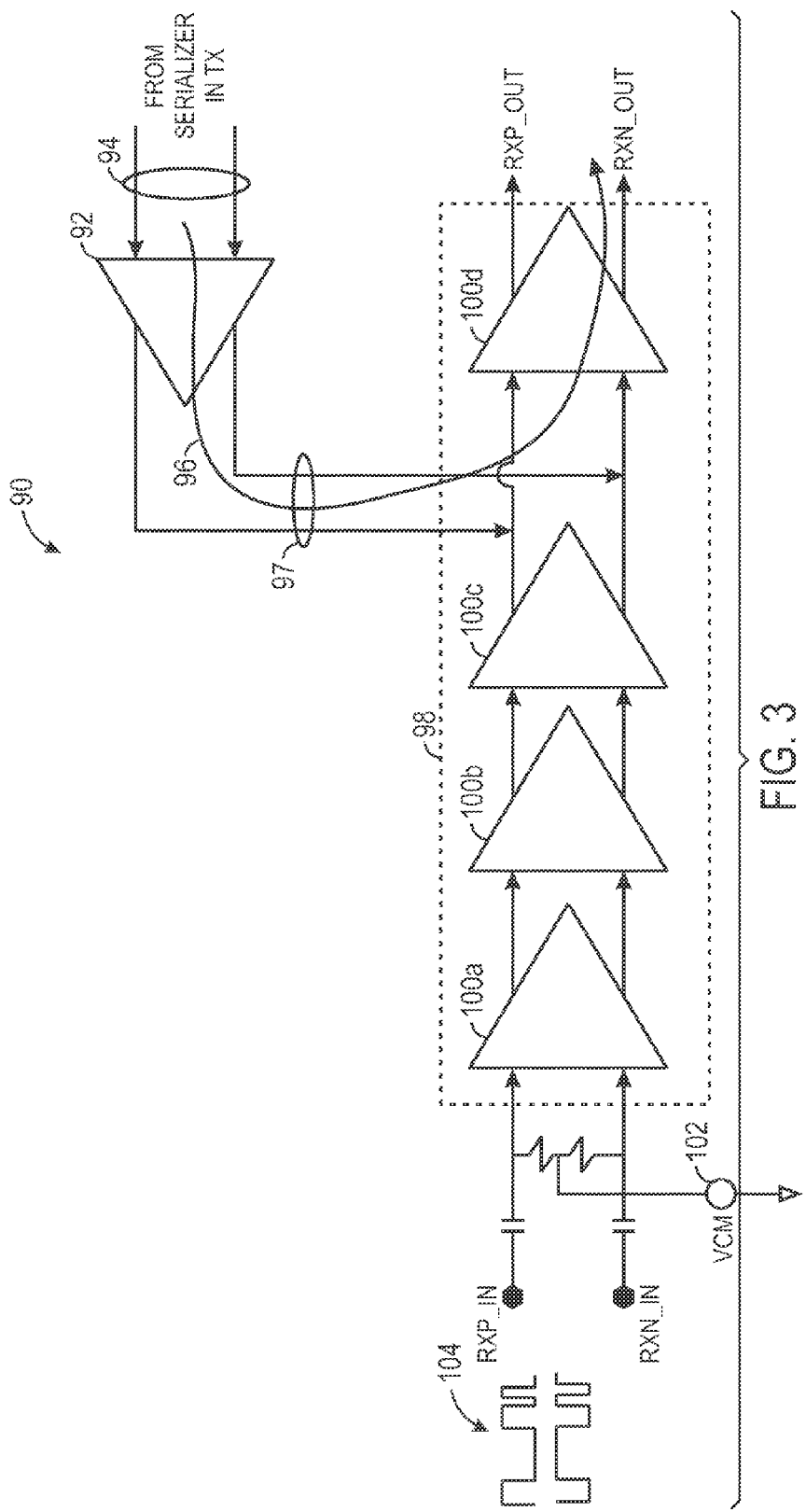
FIG. 3 is a circuit diagram showing how loopback testing may be implemented in a transceiver having a receiver buffer with multiple equalizer stages.

Referring now to FIG. 3, a simplified circuit diagram 90 showing a transceiver operating in a serial loopback testing mode is illustrated. The illustrated transceiver of FIG. 3 is intended to illustrate how serial loopback testing may be implemented when the RX differential buffer includes multiple equalizer stages, as opposed to a single stage equalizer of the RX buffer 56 of FIG. 2. Accordingly, similar elements in FIG. 3 have been labeled with different reference numerals to emphasize this difference.

As shown in FIG. 3, in serial loopback mode, a loopback buffer 92 receives a signal from 94, which may be provided from an upstream serializer in the transmitter path. The loopback buffer 92 outputs a loopback signal 97 along a loopback path 96 going through the RX differential buffer 98 of the receiver path. As will be appreciated, loopback testing may be used as a debugging measure to identify issues (e.g., on-die issues or chip-to-chip issues) in the PLD 10, and may be used for testing the serializer at speed. In the illustrated example, the RX buffer 98 may include multiple equalizer stages, referenced here as equalizer stages 100a, 100b, 100c, and 100d. The loopback path 96 may be configured such that the loopback signal 97 passes through the last equalizer stage 100d (e.g., the equalizer stage closest to the differential output pins RXP_OUT and RXN_OUT). Thus, in this configuration, the last equalizer stage 100d remains powered on during serial loopback mode, which may allow for the incoming loopback signal 97 to pass to the RXP_OUT and RXN_OUT pins and further downstream to additional components, such as a clock recovery unit and/or another buffer in a path back to the TX buffer of the transmitter side.

In the illustrated embodiment, reference number 102 refers to a common mode voltage driver that provides a common mode voltage for keeping all devices in the equalizer correctly biased during operation. By way of example, for a 1.1 V supply, the common mode voltage may be set at approximately 0.8 V. The signals 104 represent differential signals that may be sent to the input pins RXP_IN and RXN_IN. As can be seen from the example shown in FIG. 3, in the case of a multi-stage equalizer, the inputs 104 to RXP_IN and RXN_IN may continue to toggle without impacting performance of the loopback path 96. This is because the intermediate equalizer stages 100a-c are powered off, which completely isolates the pins RXP_IN and RXN_IN from the loopback path 96. Thus, while powering off certain equalizer stages is an acceptable solution in the case of an RX buffer having multiple equalizer stages, additional problems may arise in certain transceivers in which the RX buffer includes only a single equalizer stage.

Figure 4:
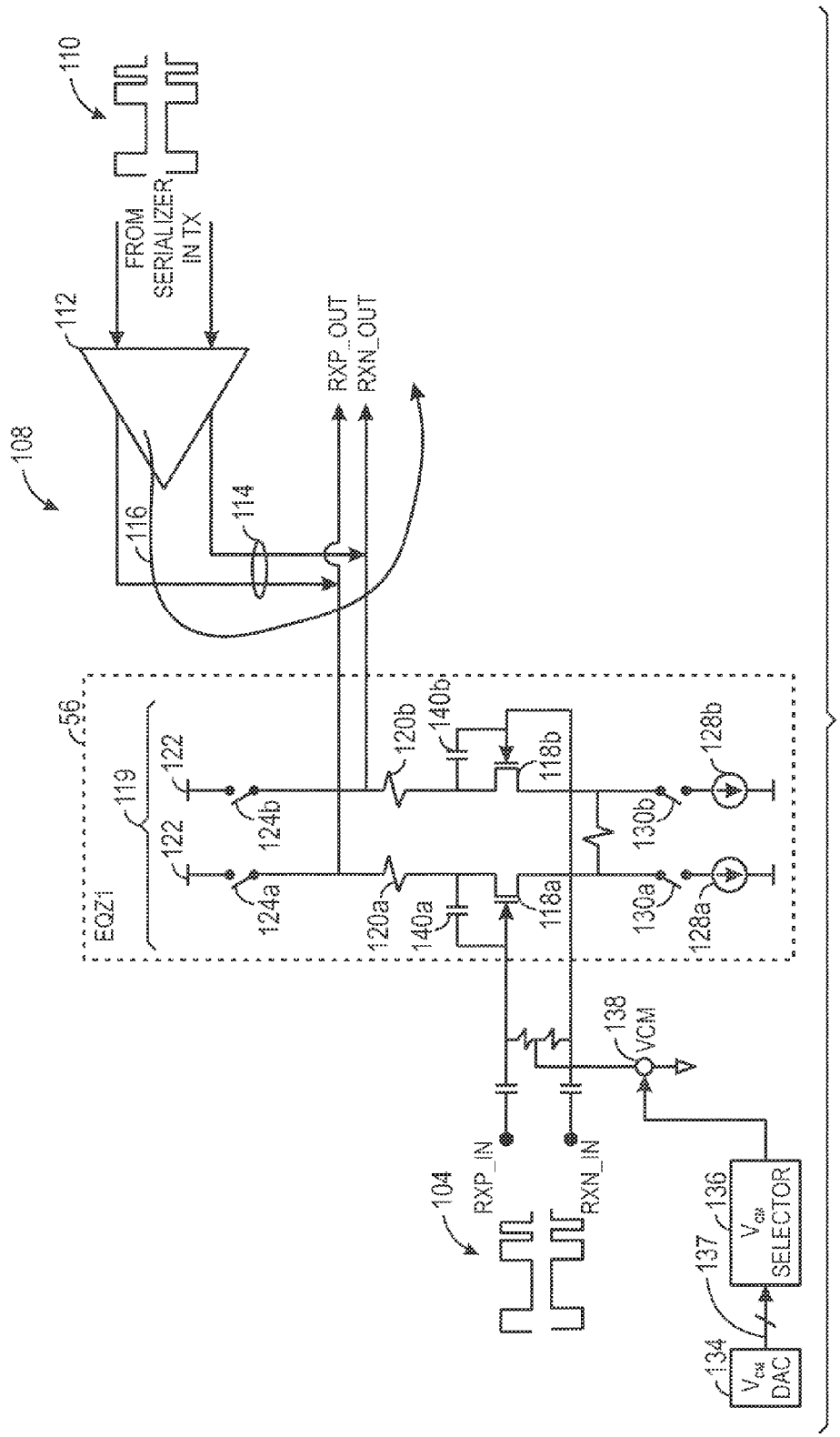
FIG. 4 is a circuit diagram showing how loopback testing may be implemented in a transceiver having a receiver buffer with a single stage equalizer, in accordance with aspects of the present disclosure.

Referring to FIG. 4, another simplified circuit diagram 108 is illustrated and shows a transceiver (e.g., transceiver 28 of FIG. 2) operating in a serial loopback testing mode. As shown, in this example, the RX buffer 56 includes only a single equalizer stage. To perform serial loopback testing, data signals from TX serializer 44 (FIG. 2) may be routed to the loopback buffer 112, which provides the loopback signal 114 along the loopback path 116. For instance, the loopback path 116, as shown in FIG. 4, is essentially from the output of the loopback buffer 112 to the RXP_OUT and RXN_OUT pins of the RX buffer 56. Thus, unlike the example shown in FIG. 3, the loopback path 116 does not pass through an equalizer stage during loopback testing, since the RX buffer 56 includes only a single stage equalizer 119.

The equalizer 119 may include transistors 118a, 118b, which function as equalizer input devices. The transistors 118a, 118b may include field effect transistors (e.g., MOSFET, JFET, etc.). For instance, the gates of transistors 118a, 118b may be coupled to the RXP_IN and RXN_IN input pins, respectively, which receive the input signals 104. The equalizer 119 may also include equalizer load resistors 120a, 120b, both of which are coupled to a power supply 122 on one side and to the drain terminals of transistors 118a, 118b, respectively, on the other side. Additionally, the equalizer 119 includes biasing current sources 128a, 128b coupled to the source terminals of the transistors 118a, 118b, respectively.

When operating in loopback testing mode, the equalizer 119 is powered off. Accordingly, the equalizer 119 also includes switches 124a, 124b, and 130a, 130b, which may be used to power off the equalizer 119. For instance, to power off the equalizer 119, the switches 124a, 124b may be operated into an open position, thus disconnecting the equalizer load resistors 120a, 120b, respectively, from the power supply 122. Additionally, the switches 130a, 130b may be operated into an open position, which disables the biasing current sources 128a, 128b, respectively. However, as can be appreciated, despite the equalizer 119 being in a powered down state, the RX input pins (RXP_IN, RXN_IN) may continue to toggle due to the signals 104. The transitions in the signals 104 may generate capacitive coupling between the gate and drain of the transistors 118a, 118b, resulting in parasitic capacitances 140a and 140b. These capacitances 140a, 140b may negatively affect the loopback signal 114 at the output of the loopback buffer 112.

Figure 5A:
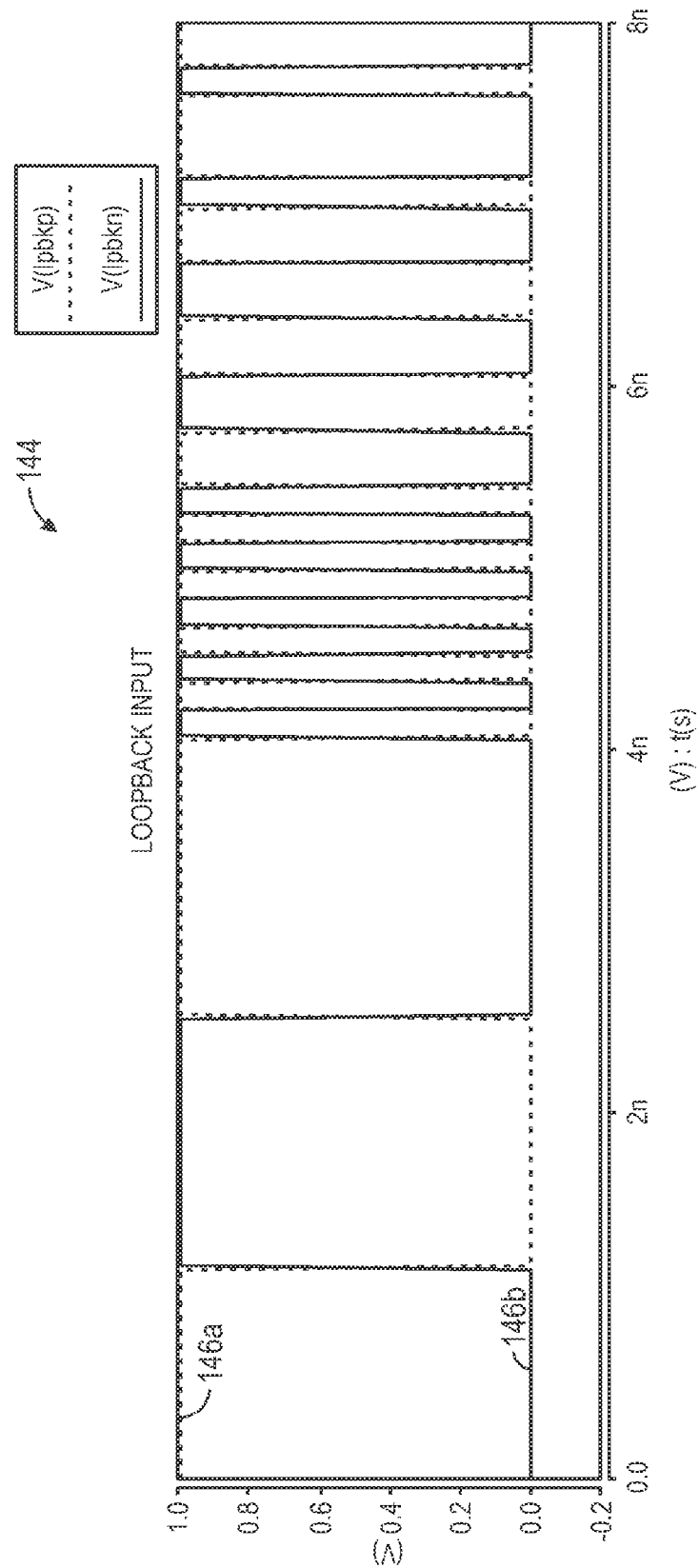
FIG. 5A is a timing diagram showing loopback input signals.
Figure 5B:
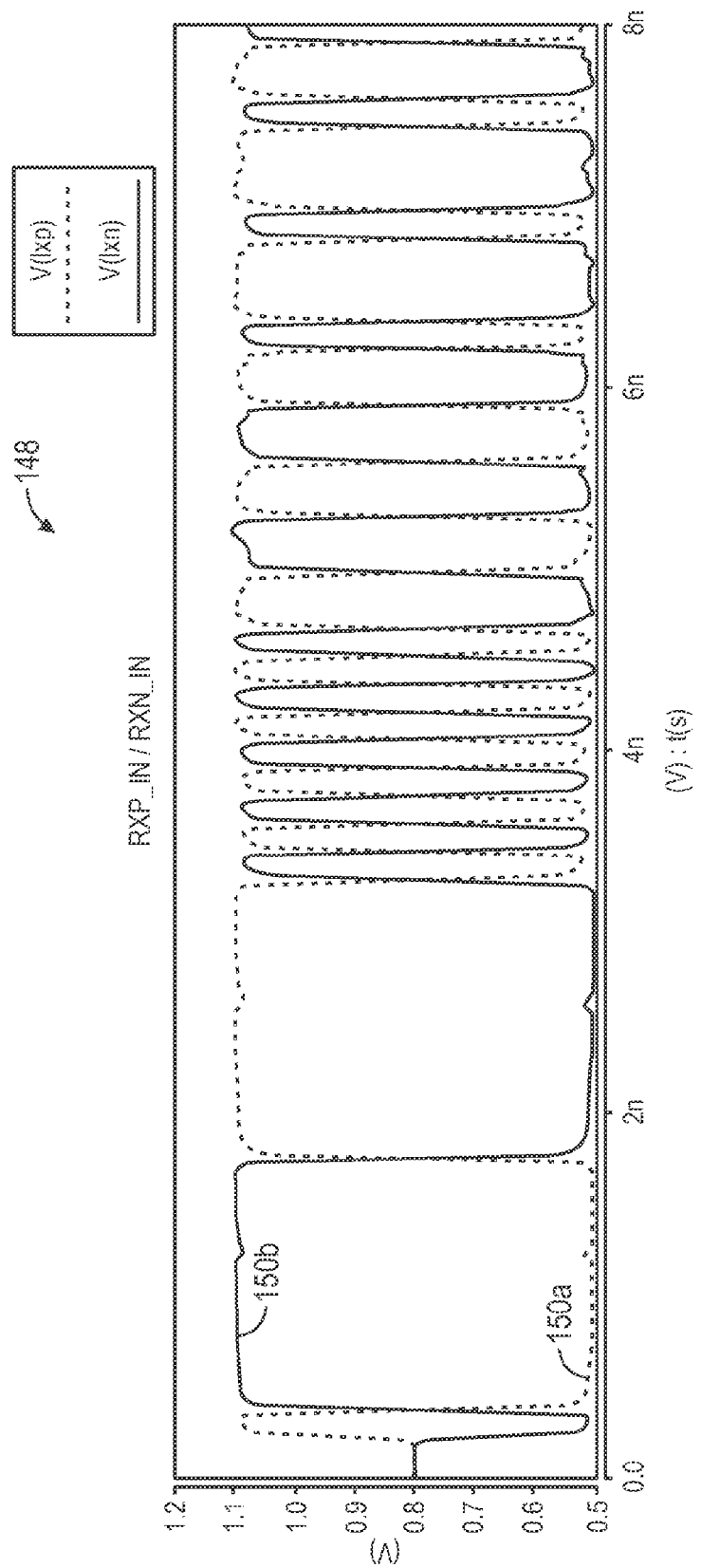
FIG. 5B is a timing diagram showing input signals that may be provided to the input pins of a receiver buffer during loopback testing.
Figure 5C:
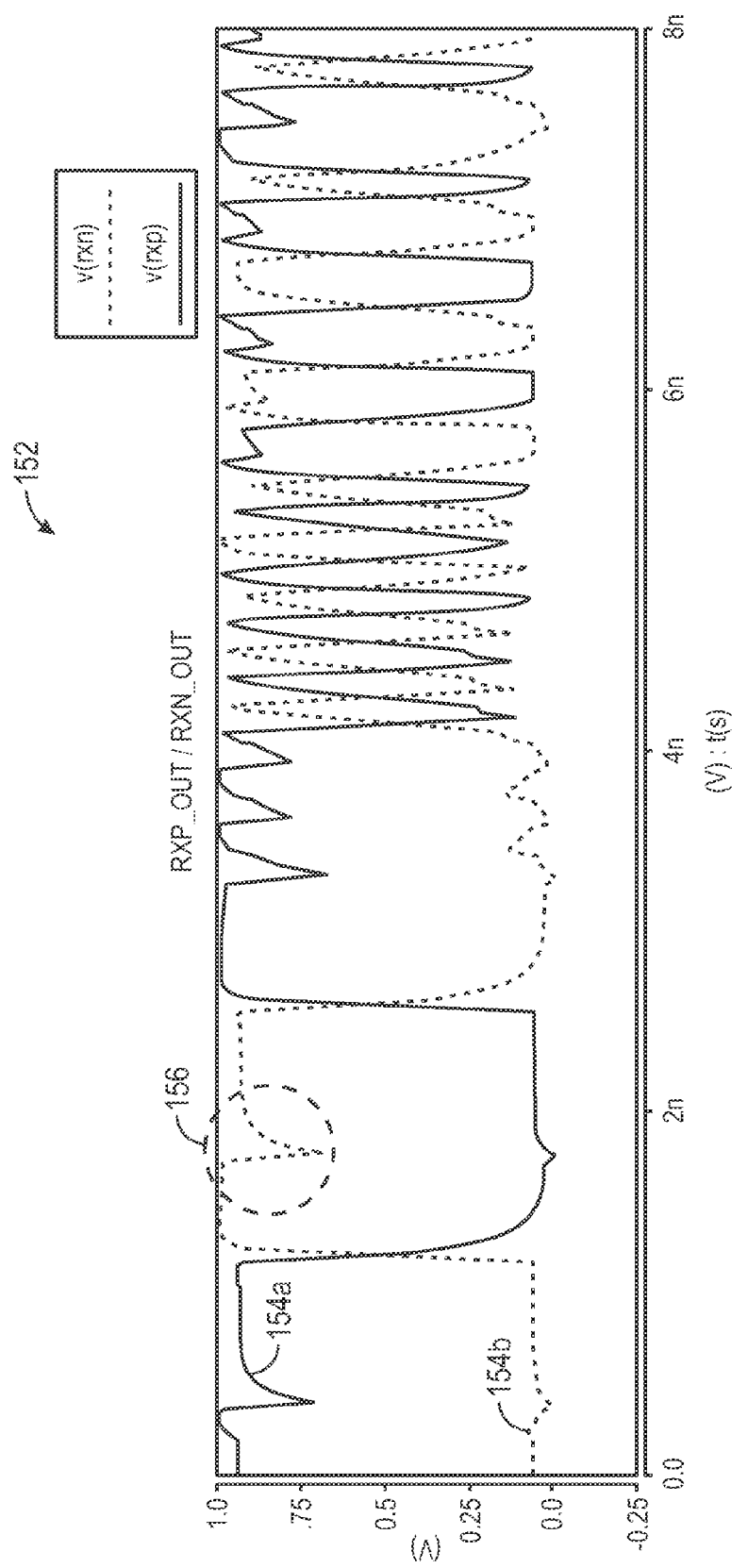
FIG. 5C is a timing diagram showing how capacitive coupling due to the input signals of FIG. 5B may affect the performance of the loopback output signal at the output pins of the receiver buffer.
Figure 5D:
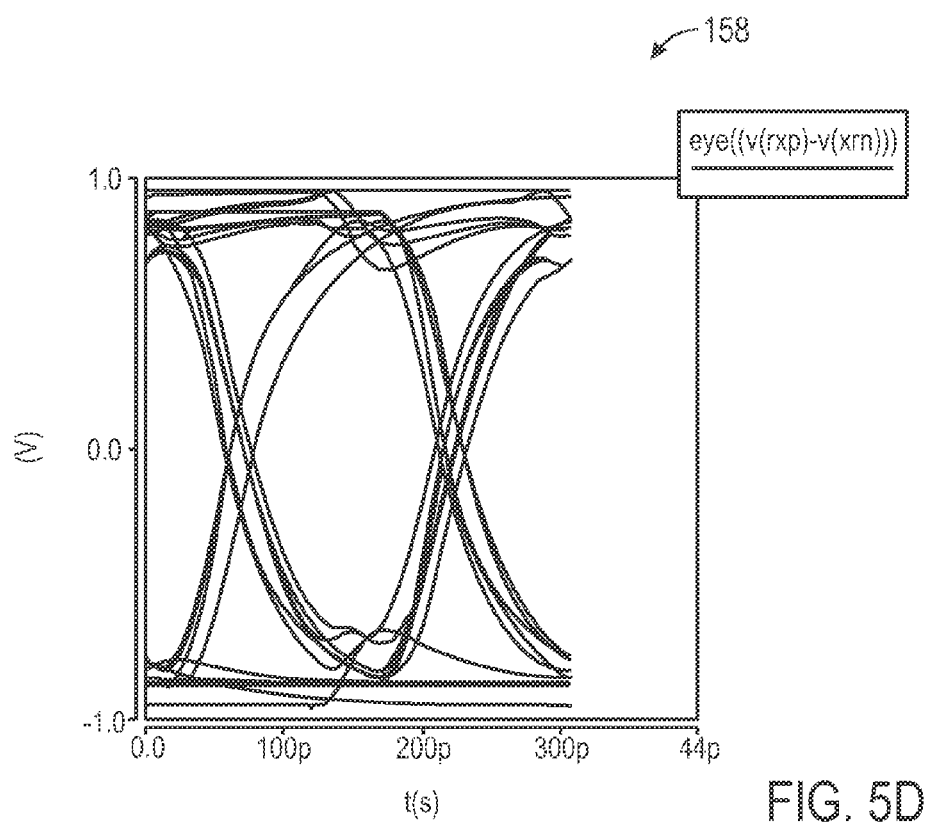
FIG. 5D is an eye diagram showing how capacitive coupling affects the loopback output signal at the output pins of the receiver buffer.

Referring now to FIGS. 5A-5D, FIG. 5A depicts a timing diagram 144 showing differential signals 146a, 146b, which may represent the loopback input signal 110 (e.g., from the serializer 44). FIG. 5B depicts a timing diagram 148 showing differential signals 150a, 150b, which may represent the inputs to the pins RXP_IN and RXN_IN, respectively. Assuming the equalizer 119 of FIG. 4 uses the same example parameters from FIG. 3 (e.g., 1.1 V supply and a 0.8 V common mode voltage), FIG. 5B indicates that the common mode voltage for the equalizer 119 is maintained at 0.8V during loopback testing. Further, FIG. 5C depicts a timing diagram 152, which shows differential signals 154a, 154b. These signals 154a, 154b may represent the loopback output at the pins RXP_OUT and RXN_OUT, respectively. As can be seen in FIG. 5C, when continued toggling of the RX input pins occurs during loopback testing, the resulting capacitive coupling (e.g., parasitic capacitances 140a, 140b) may affect the loopback output, such as by causing fluctuations 156 in the signal 114. As further shown in FIG. 5D, an eye diagram 158 representative of the signal at the RX output pins (FIG. 5C) is noticeably impacted due to the coupling from the RX input pins.

One method for reducing these capacitive coupling effects from the RX input pins during loopback testing may be to instruct a customer to turn off or otherwise disable the inputs to the RX pins when enabling the loopback path 116. However, this may not always be feasible. For instance, it may be impractical to disable the RX input pins in situations where the customer is utilizing the loopback mode for isolating link issues (e.g., between two devices) without AC-JTAG support.

Referring back to FIG. 4, the presently illustrated embodiment provides a technique for reducing the capacitive coupling effects mentioned above. For example, the circuit diagram 108 of FIG. 4 further illustrates an adjustable common mode voltage driver 138, which may be configured to reduce the common mode voltage supplied to the equalizer 119 during loopback testing. By way of example, using the same sample values from above, for a 1.1 V supply with a common mode voltage of 0.8 during normal receiver operation, the common mode voltage maybe lowered to between approximately 0.3 V to 0.4 V, i.e., approximately 0.35 V in the present example. In the illustrated embodiment, the adjustable common mode voltage driver 138 includes a common mode voltage ($V_{CM}$) digital to analog converter (DAC) 134 and a $W_{CM}$ selector 136. For instance, the DAC 134 may be implemented using a resistor string in one embodiment, wherein the resistor string has taps providing a range of available voltage values 137 for $V_{CM}$. The values 137 may be provided to the selector 136, which may be implemented using a multiplexer or any suitable type of selection circuitry.

Accordingly, in loopback mode, the selector 136 may select an appropriate $W_{CM}$ value 139 (e.g., a lower value—such as 0.35 V compared to 0.8 V in normal operation) for loopback testing and the selected value may be provided to the equalizer 119 by the driver 138. When exiting loopback mode and resuming normal RX operation, $W_{CM}$ may be adjusted back to the level for normal operation by selecting the appropriate value (e.g., 0.8 V) from the available values 137 using the selector 136. As can be appreciated, the adjustment of the common mode voltage may be initiated by control logic (not shown in FIG. 4), which may be configured to detect when the RX buffer is operating in normal mode or loopback mode (e.g., detecting whether a loopback path is enabled). In certain embodiments, the adjusted common mode voltage for loopback testing may be at most half (e.g., 50% of less) that of the common mode voltage for normal operation. Further, the operation of the switches 124a, 124b and 130a, 130b, as well as the selector 136, may be controlled by the aforementioned control logic.

Figure 5E:
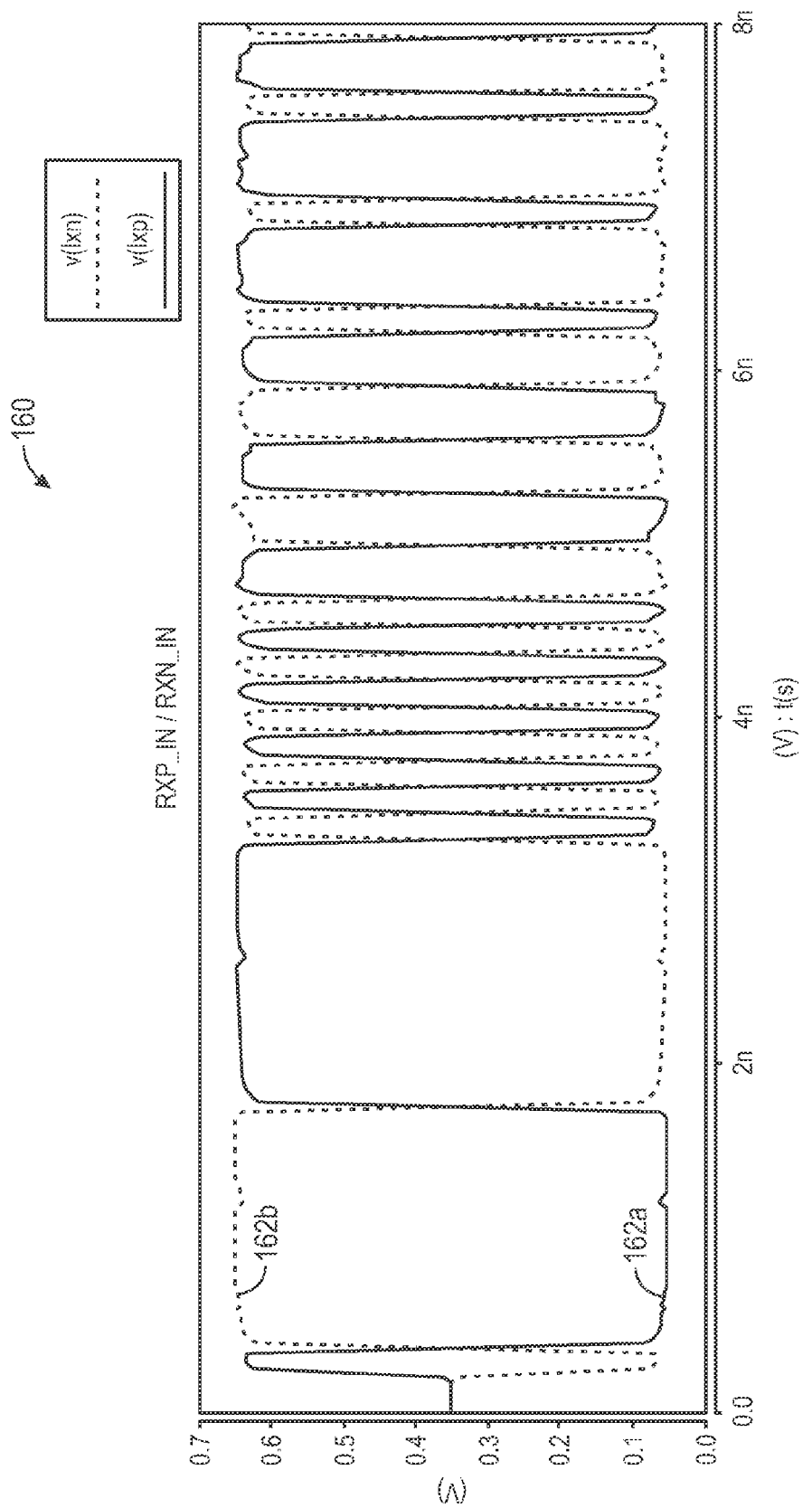
FIG. 5E is a timing diagram showing input signals that may be provided to the input pins of a receiver buffer during loopback testing when a common mode voltage for the equalizer is reduced, in accordance with aspects of the present disclosure.
Figure 5F:
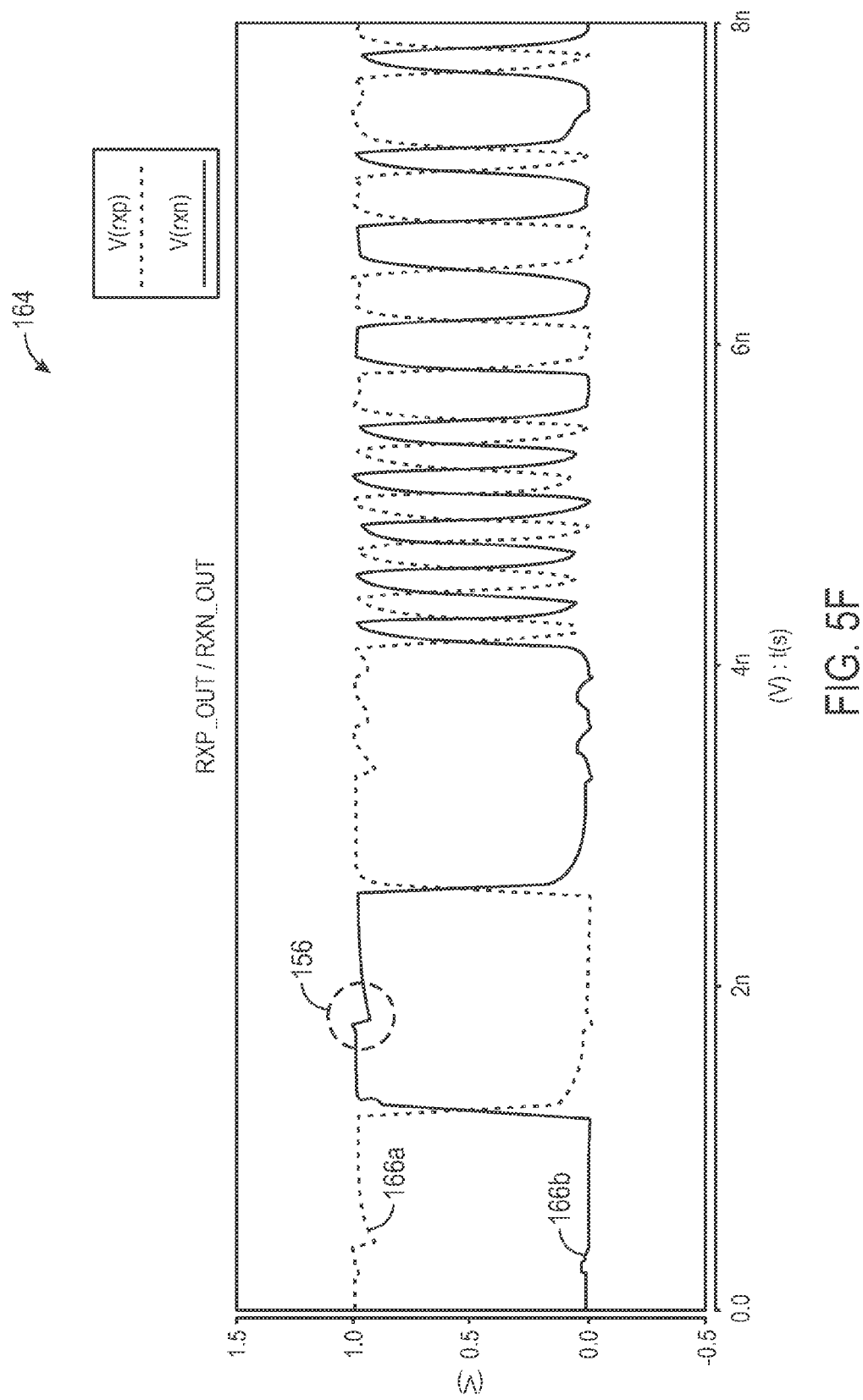
FIG. 5F is a timing diagram showing how capacitive coupling is reduced when the common mode voltage is lowered, resulting in improved performance of the loopback output signal at the output pins of the receiver buffer, in accordance with aspects of the present disclosure.
Figure 5G:
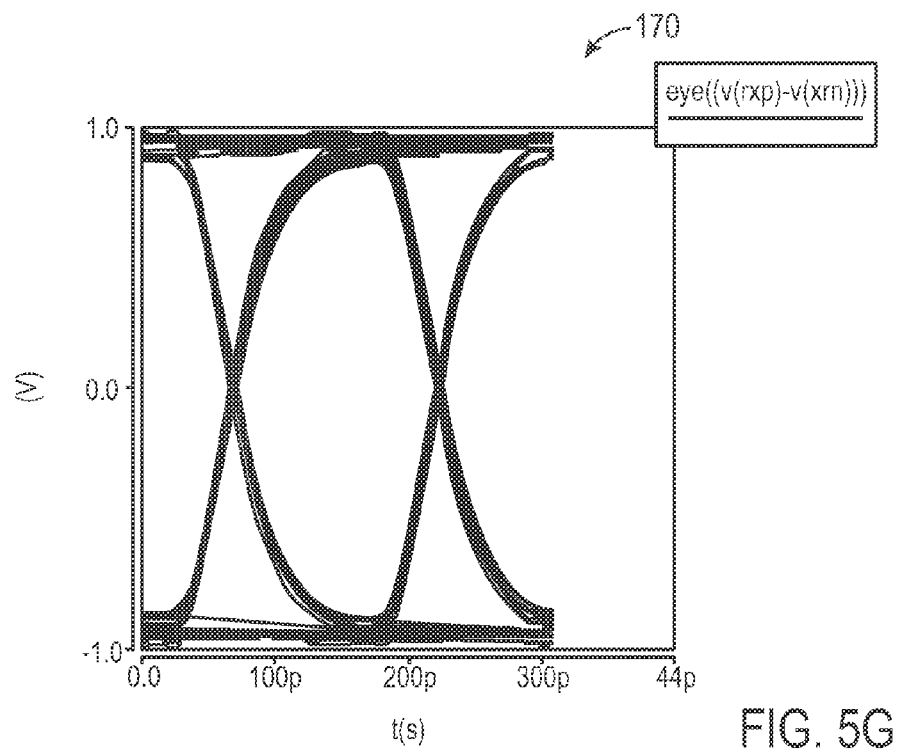
FIG. 5G is an eye diagram showing the improved loopback output signal at the output pins of the receiver buffer.

When the loopback path is enabled, the lowering of the common mode voltage of the equalizer 119 may reduce the impact of capacitive coupling, since now the RXP_IN and RXN_IN pins, acting as aggressors (e.g., switching I/O elements causing SSN noise), are at a lower voltage level. Simulation results showing improved performance during loopback testing with $W_{CM}$ pulled down to a lower level are provided in FIGS. 5E-5G. For instance, assuming the same loopback input signals 110 (FIG. 5a) are provided, FIG. 5E depicts a timing diagram 160 showing differential signals 162a, 162b, which may represent the inputs to the pins RXP_IN and RXN_IN, respectively, when the common mode voltage is reduced for loopback testing. For instance, the signals 162a, 162b of FIG. 5E have similar behavior to the signals 150a, 150b, respectively, of FIG. 5B, except that the signals 162a, 162b have a reduced swing due to the lowered common mode voltage. FIG. 5F depicts a timing diagram 164, which shows differential signals 166a, 166b. These signals 166a, 166b may represent the loopback output at the pins RXP_OUT and RXN_OUT, respectively, with the common mode voltage reduced. As can be seen in FIG. 5F, even when continued toggling of the RX input pins occurs during loopback testing, the lowering of the common mode voltage reduces capacitive coupling, which may make the fluctuations 156 in the signal 114 less noticeable. Moreover, referring to FIG. 5G, an eye diagram 170 representative of the signal at the RX output pins (FIG. 5F) is noticeably improved (when compared to the eye diagram 158 of FIG. 5D) when the common mode voltage for the equalizer is reduced. That is, while some effects due to coupling are still present, the effects are lessened as a result of the $W_{CM}$ reduction, thus resulting in the eye diagram 170 being cleaner.

Figure 6A:
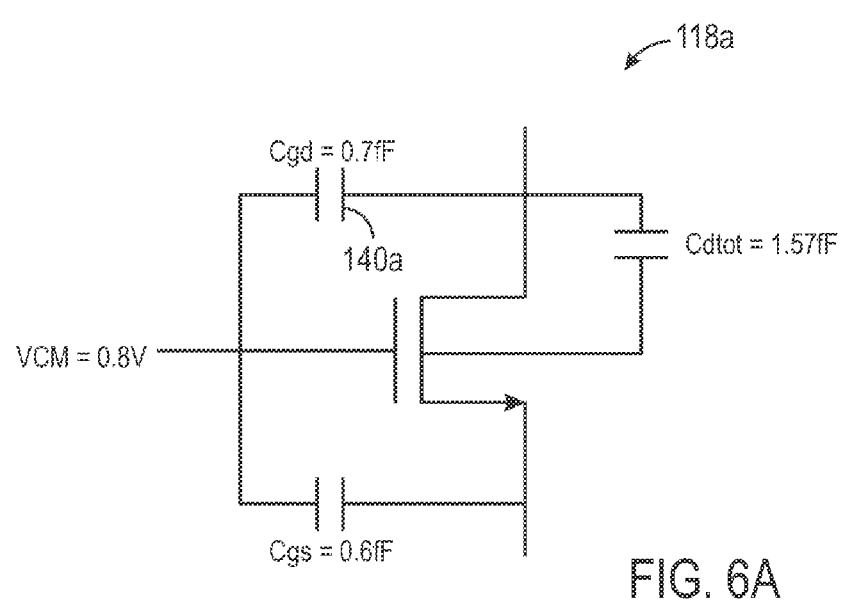
FIGS. 6A and 6B illustrate how reducing a common mode voltage results in a reduction in parasitic capacitance on an equalizer input device.
Figure 6B:
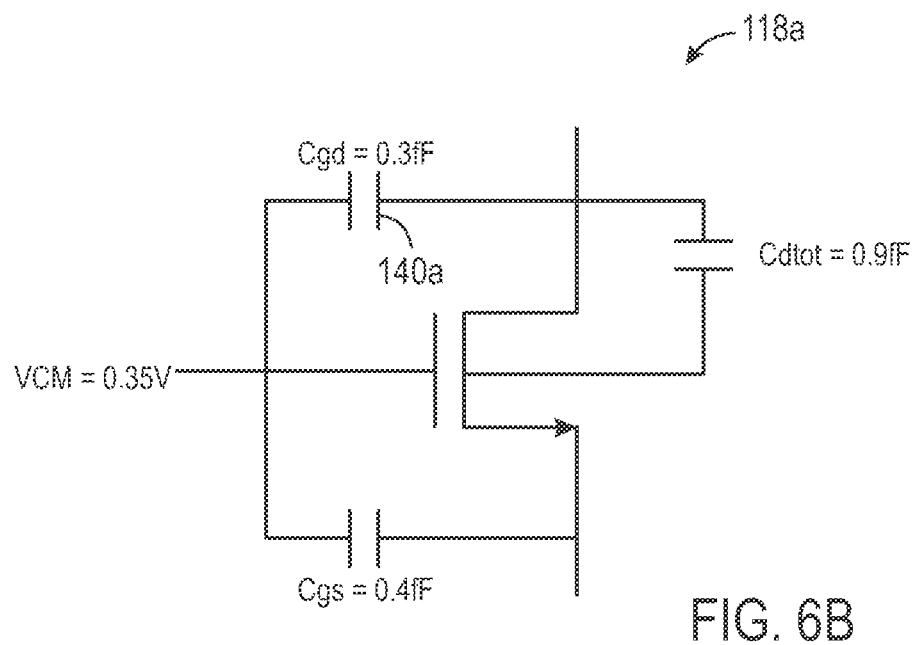

FIGS. 6A and 6B illustrate in more detail how the adjustment of the common mode voltage during loopback testing may reduce capacitive coupling on the RXP_OUT and RXN_OUT pins. For instance, referring to FIG. 6A, the transistor 118a is shown with the common mode voltage of the equalizer 119 set to 0.8V (again assuming a 1.1 V supply). A voltage of 0.8 V may meet or exceed the threshold voltage of the transistor 118a, causing it to be fully switched on. In this particular example, based on a common mode voltage of 0.8 V, the gate-to-drain capacitance ($C_{gd}$) may be approximately 0.7 fF, the drain capacitance ($C_{dtot}$) may be approximately 1.57 fF, and the gate-to-source ($C_{gs}$) capacitance may be approximately 0.6 fF. Referring to FIG. 6B, when the common mode voltage is reduced to 0.35 V for loopback testing, the capacitances are all reduced. For instance, $C_{gd}$ is reduced to approximately 0.3 fF, $C_{dtot}$ is reduced to approximately 0.9 fF, and $C_{gs}$ is reduced to approximately 0.4 fF. Here, because the reduced common mode voltage 0.35 V may be less than the threshold voltage of the transistor 118a, the capacitances are lower, which also reduces capacitive coupling.

As can be appreciated, the reduced common mode voltage level may be selected depending on the specific operating parameters for the equalizer input devices (e.g., transistors 118a, 118b). For instance, a transistor may have certain stress limits, wherein exceeding such limits may stress and possibly damage the device. For instance, a transistor may have a stress limit with regard to its gate-drain voltage. Thus, the common mode voltage for loopback testing should be selected such that the stress limit for the transistor is not exceeded.

Figure 7:
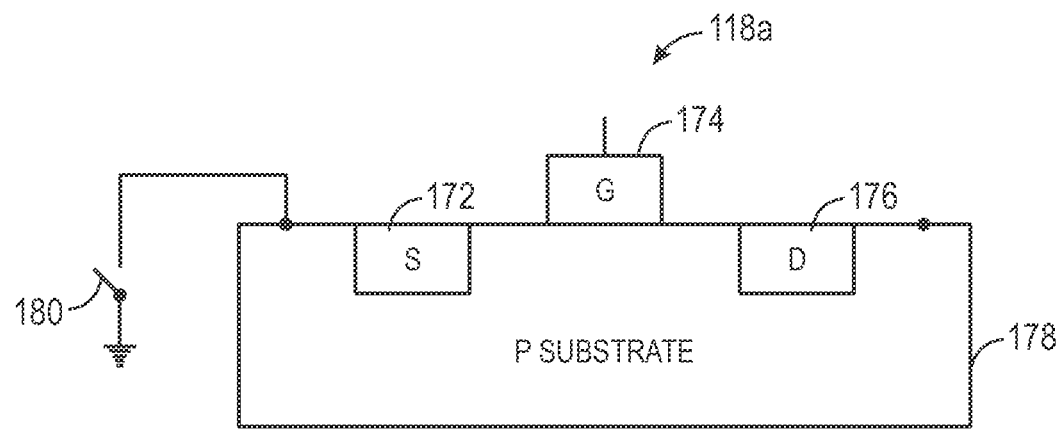
FIG. 7 illustrates an embodiment for grounding the bulk node of an equalizer input device during loopback testing to reduce capacitive coupling at the receiver output pins.

In another embodiment, instead of or in addition to lowering the common mode voltage during loopback testing, the bulk node of the equalizer input device (e.g., transistor 118a) may be grounded during loopback testing. This may increase the threshold voltage of the transistor due to body effect, such that the transistor 118a needs a higher voltage to switch on. For instance, referring to FIG. 7, a simplified cross-sectional view of the transistor 118a is provided. The transistor 118a includes a source 172, gate 174, drain 176, and a bulk substrate 178. During loopback testing, the substrate 178 may be grounded by controlling the switch 180 to a closed position (e.g., using control logic). As can be appreciated, the threshold voltage ($V_{TH}$) for a transistor may be determined as the difference between the source voltage (V(s)) and the bulk voltage (V(b)). Thus, when the bulk substrate 178 is grounded (e.g., 0 V), $V_{TH}$ is increased. If grounding the bulk substrate 178 increases the threshold voltage such that a higher voltage is needed to turn on the transistor, this may also reduce capacitive coupling. For example, if grounding the bulk substrate 178 increased the threshold voltage to above 0.8 V, the transistors 118a, 118b may effectively be shut off and capacitive coupling may be reduced without necessarily also reducing the common mode voltage, as discussed above.

Figure 8:
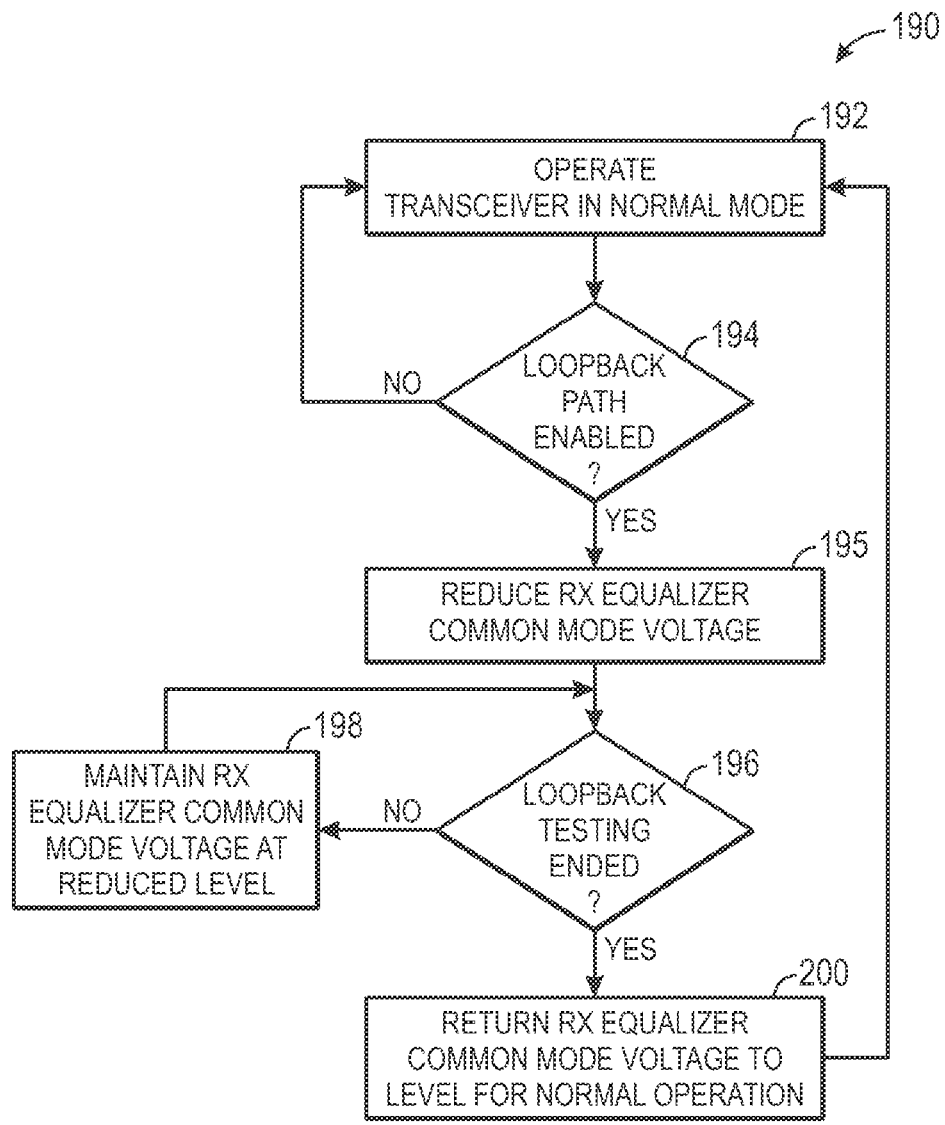
FIG. 8 is a flow chart depicting a process for implementing serial loopback testing in a programmable logic device having a transceiver with a single-stage equalizer in a receiver channel.

FIG. 8 provides a flow chart depicting a process 190 for implementing loopback testing in an IC having transceivers with single-stage equalizers in its receiver channels. The process 190 begins at step 192 wherein a transceiver is operated in a normal mode. Subsequently, decision logic 194 determines whether a loopback testing mode has been enabled by determining whether a loopback path has been enabled. If no loopback path is enabled, the process 190 returns to step 192. If a loopback path is enabled, the process 190 continues from decision logic 194 to step 195, at which the common mode voltage of the RX equalizer is reduced and/or the bulk node of the equalizer input device (e.g., transistor 118a) may be grounded. Thereafter, decision logic 196 determines if loopback testing has ended (e.g., determining if the loopback is still enabled). If loopback testing has not ended, process 190 continues to step 198, where the common mode voltage is maintained at the reduced level and/or the bulk node of the equalizer input device may remain grounded, and returns to decision logic 196. If decision logic 196 determines that loopback testing has ended, the process 190 continues to step 200 where the common mode voltage of the RX equalizer is returned to a proper level for normal operation and/or the bulk node of the equalizer input device is no longer connected to ground. As shown in FIG. 8, from step 200, the process 192 may return to the first step 192 and continue.

While the invention may be susceptible to various modifications and alternative forms, specific embodiments have been shown by way of example in the drawings and have been described in detail herein. Therefore, it should be understood that the invention is not intended to be limited to the particular forms disclosed. Rather, the invention is to cover all modifications, equivalents, and alternatives falling within the spirit and scope of the invention as defined by the following appended claims.

What is claimed is:

1. A method comprising:
   in an integrated circuit (IC) comprising at least one receiver channel having a receiver buffer with an equalizer, determining whether a loopback mode of operation is enabled; and
   when the loopback mode of operation is enabled, powering down at least one stage of the equalizer and:
      reducing a common mode voltage provided to the equalizer from a first voltage to a second voltage;
      connecting a bulk node of the equalizer to electrical ground; or
      both;
      such that capacitive coupling on a loopback path through the receiver buffer is reduced.

2. The method of claim 1, wherein powering down the at least one stage of the equalizer comprises powering down at least a final stage of the equalizer.

3. The method of claim 1, wherein powering down the at least one stage of the equalizer comprises powering down the only stage of the equalizer, wherein the equalizer comprises a single-stage equalizer.

4. The method of claim 1, wherein powering down the at least one stage of the equalizer comprises disconnecting a first biasing current source from a source terminal of a first equalizer device and disconnecting a second biasing current source from a source terminal of a second equalizer device, wherein the first equalizer device and the second equalizer device each comprise a transistor.

5. The method of claim 1, wherein reducing the common mode voltage from the first voltage to the second voltage comprises using selection logic to select a voltage equivalent to the second voltage from a plurality of voltage levels.

6. The method of claim 5, comprising using a digital to analog converter to provide the plurality of voltage levels.

7. The method of claim 1, comprising:
   after reducing the common mode voltage to the second voltage, determining if the loopback mode of operation is disabled; and
   when the loopback mode of operation is not enabled:
      increasing the common mode voltage from the second voltage to the first voltage;
      disconnecting the bulk node of the equalizer from electrical ground; or
      both.

8. An integrated circuit device comprising:
   a transceiver comprising a receiver path having a differential buffer, wherein the differential buffer comprises at least one equalizer;
   a loopback path configured to connect into the receiver path to enable a loopback testing mode; and
   adjustable common mode voltage circuitry configured to provide a first common mode voltage to the equalizer when the loopback testing mode is not enabled and a second common mode voltage to the equalizer when the loopback testing mode is enabled, wherein the second common mode voltage is less than the first common mode voltage.

9. The integrated circuit device of claim 8, wherein the loopback path comprises a loopback buffer configured to receive a loopback input data signal and a signal path coupling an output of the loopback buffer to output pins of the differential buffer.

10. The integrated circuit device of claim 9, wherein the loopback input data signal is provided by a serializer in a transmitter path of the transceiver.

11. The integrated circuit device of claim 8, wherein the adjustable common mode voltage circuitry comprises:
    a digital-to-analog converter configured to provide a plurality of voltages;
    selection logic configured to receive the plurality of voltages and select a voltage equivalent to the first common mode voltage when the loopback testing mode is not enabled or a voltage equivalent to the second common mode voltage when the loopback testing mode is enabled; and
    a driver configured to provide the selected voltage to the equalizer.

12. The integrated circuit device of claim 11, wherein the digital-to-analog converter comprises a resistor string.

13. The integrated circuit device of claim 8, wherein the loopback path is configured to connect to the receiver path after the equalizer.

14. The integrated circuit device of claim 8, wherein the equalizer comprises a single-stage equalizer.

15. The integrated circuit device of claim 8, wherein the second common mode voltage is at most half the first common mode voltage.

16. The integrated circuit device of claim 8, comprising a field-programmable gate array.

17. The integrated circuit device of claim 8, comprising bulk node grounding circuitry configured to connect a bulk node of the equalizer to electrical ground when the loopback testing mode is enabled.

18. An integrated circuit comprising:
    a transceiver comprising a receiver channel, wherein the receiver channel comprises a buffer having at least one equalizer stage, and wherein the at least one equalizer stage comprises a first transistor having a gate coupled to a first differential input of the buffer and a second transistor having a gate coupled to a second differential input of the buffer;
    a loopback path configured to connect to the receiver channel to enable a loopback mode of operation; and
    control logic configured to connect a bulk node of the first transistor and a bulk node of a second transistor to ground when the loopback mode of operation is enabled.

19. The integrated circuit device of claim 18, wherein a loopback output signal is sent from first and second differential outputs of the buffer to a second buffer downstream of the differential outputs, wherein the second buffer is part of a signal path to a buffer on a transmitter channel of the transceiver.

20. The integrated circuit device of claim 19, wherein the loopback output signal is also sent from the first and second differential outputs to a clock recovery unit.

21. A method of manufacturing an integrated circuit device comprising:
    providing a transceiver comprising a receiver channel having a differential buffer with at least one equalizer stage;

providing a loopback path through the receiver channel, wherein the loopback path is configured to be enabled for loopback testing;

providing control logic configured to enable and disable loopback testing; and providing:
- an adjustable common mode voltage driver configured to reduce a common mode voltage provided to the at least one equalizer stage when loopback testing is enabled; or
- bulk node grounding circuitry configured to connect a bulk node of the at least one equalizer stage to electrical ground when loopback testing is enabled; or
- both the adjustable common mode voltage driver and the bulk node grounding circuitry.

* * * * *